United States Patent [19]
Hiroshi
[11] Patent Number: 4,759,818
[45] Date of Patent: Jul. 26, 1988

[54] THERMO-TRANSFER PRINTING EQUIPMENT

[76] Inventor: Sakurai Hiroshi, 27-4, Minamioi 5-chome, Shinagawa-Ku, Tokyo, Japan, 140

[21] Appl. No.: 776,873

[22] Filed: Sep. 17, 1985

[51] Int. Cl.[4] ........................ B44B 5/00; B32B 31/16; B30B 5/02

[52] U.S. Cl. .................................. 156/359; 156/73.6; 156/240; 156/361; 156/542; 156/582; 156/583.1; 101/210

[58] Field of Search ............... 156/359, 361, 540, 541, 156/542, 584, 580.1, 387, 580.2, 230, 241, 235, 240, 73.6, 583.4, 583.5, 583.6, 583.7, 583.1, 582; 267/80; 269/909; 100/210

[56] References Cited

U.S. PATENT DOCUMENTS

| | | | |
|---|---|---|---|
| 3,620,881 | 11/1971 | Kanneglesser | 156/240 |
| 3,660,208 | 5/1972 | Hubbard | 156/359 |
| 3,982,979 | 9/1976 | Hentz et al. | 156/235 |
| 4,242,166 | 12/1980 | Izumihara | 156/359 |
| 4,263,077 | 4/1981 | Rampelberg | 156/240 |
| 4,393,116 | 7/1983 | Taylor | 156/230 |
| 4,399,178 | 8/1983 | Barta | 156/230 |

*Primary Examiner*—Michael Ball
*Assistant Examiner*—Louis Falasco
*Attorney, Agent, or Firm*—John E. Toupal; Harold G. Jarcho

[57] ABSTRACT

A system for transferring an image to an article and includes a base for supporting the article, an article conveyor for sequentially moving articles onto and off of the base in a given direction between an entrance end and an exit end, a roller disposed adjacent to the base, an image conveyor for sequentially moving transferrable images into a position between the base and the roller, a transfer mechanism for producing relative movement between the base and the roller such that an image and an article are pressed together therebetween, a primary heater for transferring heat to a first surface portion of said roller located opposite to the base, and an auxiliary heater for transferring heat to a second surface portion of the roller end located between the first surface portion and the exit end of said base.

3 Claims, 6 Drawing Sheets

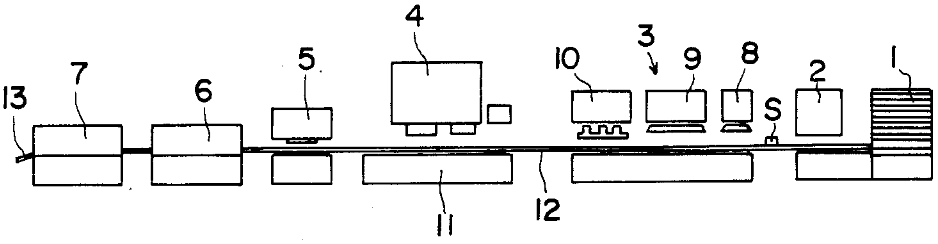
F/G.1
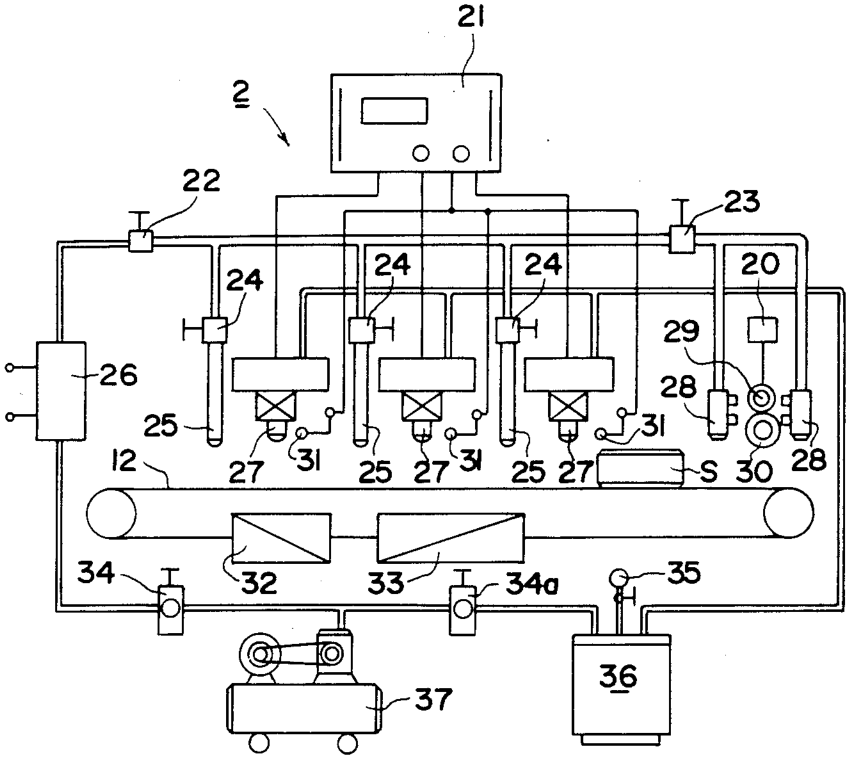
F/G.3

THERMO-TRANSFER PRINTING EQUIPMENT

BACKGROUND OF THE INVENTION

The present invention relates to a system for heat-transferring an image printed or vaporized on the surface of a transfer film onto an article such as a cake of soap.

Heat transfer systems are used to apply images to the surface of articles having predetermined shapes unlike ordinary sheets of paper. In such applications, the finish of products is significantly affected by the material forming the articles receiving the image. Pressing force, heating temperature and heating time used for a heat transfer present problems that often result in unacceptable articles. For those reasons, it is sometimes impossible to heat transfer images onto certain articles.

Generally, efficient heat transfer devices have been proposed in which a transfer film retaining an image is pressed against a receiving article by a heated roller. However, in these devices, if transfer speed increases, unevenness in surface temperature of the heated roller occurs, resulting in the production of unacceptable articles. This is caused by the fact that the heated roller loses heat to a receiving article resulting in a reduction in surface temperature which cannot be quickly restored to a desired temperature by a heater disposed conventionally in one location. In attempts to correct this problem, the temperature of the heated roller can become excessive causing the transfer film to become fused to the receiving article.

One technique for alleviating the above noted problem is to increase the diameter of the heated roller to increase its heat capacity and thereby decrease the variation in temperature thereof. However, if the diameter of the heated roller is increased, other disadvantages occur such as lengthly start-up periods and roller overheating during temporary stoppages.

The object of this present invention, therefore, is to provide an improved system for heat transferring an image from a transfer film onto an article such as a cake of soap.

SUMMARY OF THE INVENTION

The invention is a system for transferring an image to an article and includes a base for supporting the article, an article conveyor for sequentially moving articles onto and off of the base in a given direction between an entrance end and an exit end, a roller disposed adjacent to the base, an image conveyor for sequentially moving transferrable images into a position between the base and the roller, a transfer mechanism for producing relative movement between the base and the roller such that an image and an article are pressed together therebetween, a primary heater for transferring heat to a first surface portion of said roller located opposite to the base, and an auxiliary heater for transferring heat to a second surface portion of the roller and located between the first surface portion and the exit end of said base. The auxiliary heater supplies to the roller surface heat removed by an article receiving an image.

According to one feature of the invention, the system includes a first temperature sensor for sensing the temperature of a third surface portion of the roller located between the first surface portion and the entrance end of the base, a second temperature sensor for sensing the temperature of a fourth surface portion of the roller located between the second surface portion and the exit end of the base, and a control system for controlling the auxiliary heater in response to the difference in temperatures sensed by the first and second temperature sensors. The temperature sensors insure an accurate return to the roller of the heat loss occuring to the articles.

According to another feature of the invention, the image conveyor comprises a belt conveyor for moving the transferrable images and the system includes a vibrator for producing vibration of the belt conveyor in the direction of separation of the roller and the base. The vibrator prevents fusion between the articles and the image conveyor.

According to still another feature of the invention, the system includes a pressure fluctuation means for cyclically varying the pressure applied between the base and the roller by the transfer mechanism. The pressure fluctuation means provides a more uniform transfer of the image onto the surface of the article.

DESCRIPTION OF THE DRAWINGS

These and other objects and features of the invention will become more apparent upon a perusal of the following description taken in conjunction with the accompanying drawings wherein:

FIG. 1 is a schematic-side view showing the outline of a heat transfer system according to the present invention;

FIG. 3 is a schematic side view showing the construction of a coating device shown in FIG. 1;

DESCRIPTION OF THE PREFERRED EMBODIMENT

Figure 2:
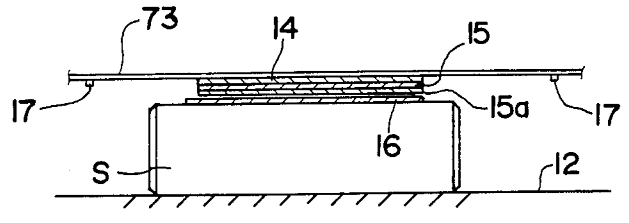
FIG. 2 is a schematic side view showing the relation between a transfer film retaining an image and an article for receiving the image.

An outline of a heat transfer system according to the present invention is shown in FIG. 1. Cakes of soap S are fed from a supply 1 to a conveyor 12. Each cake of soap receives from a coating device a top surface coating layer 16 (FIG. 2) such as a thermoplastic resin which is dried by a dryer 8. The coating is then hardened by a hardening device 3 including a heater 9 and the soap is subsequently cooled by a cooler 10. Finally, an image pre-printed on a transfer film is transferred onto the coating layer 16 of the soap S in a heat transfer machine 4.

A transferred position of the image relative to the soap S is detected by a position detector 5 and completed cakes of soap are packaged by a packaging device 6. Subsequently, the packaged cakes of soap are packed in a case by a packing device 7 and ejected through an outlet 13. The image position detected by the detector 5 is compared with a reference pattern, and if a deviation in position should occur, the position of the soap S in a pressing base 11 of the heat transfer machine 4 is corrected.

As shown in FIG. 2, the undersurface of a film 73 formed of polyester or the like, retains a printed image 15 on a peelable layer 14. The surface of the image 15 is coated with an adhesive 15*a*. Printed boundary lines 17 straddle each image 15 and the transfer film 73 is moved intermittently to position each image for transfer as will be described later.

As shown in FIG. 3, the coating device 2 includes a pair of upper and lower water absorbing rollers 29 and 30 driven by an electric motor 20 and disposed within a moving channel of the conveyor 12, a plurality of spray guns 27, compressed air nozzles 25, 28 and coating detection sensors 31. The roller 30 removes water from the surface of the soap S which is further dried by the air blow nozzles 28. Air discharged by the air blow nozzles 28 and 25 is supplied by a compressor 37, pressure regulated by a pressure regulating valve 34 and heated to a predetermined temperature by a heater 26. The air is blown against the soap S via valves 22, 23 and 24. Sprayed on the surface of the soap S by the spray guns 27 is a coating agent pressurized by the air compressor 37 via a pressure regulating valve 34*a* and supplied from a coating liquid tank 36. Since this coating agent also adheres to the conveyor 12, a cleaner 32 and a belt dryer 33 are disposed on the return side of the conveyor 12. The quantity of coating agent supplied by the spray guns 27 is controlled by a control device 21. In the illustrated embodiment, three coating layers are formed on the surface of the soap S.

Figure 4:
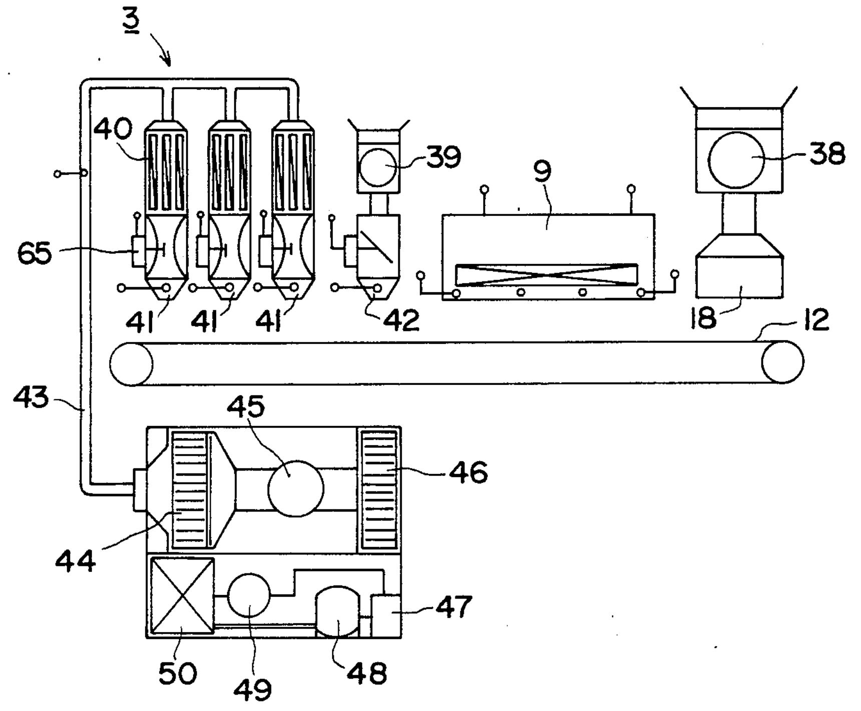
FIG. 4 is a schematic side view of a coating layer hardening device shown in FIG. 1.
Figure 5:
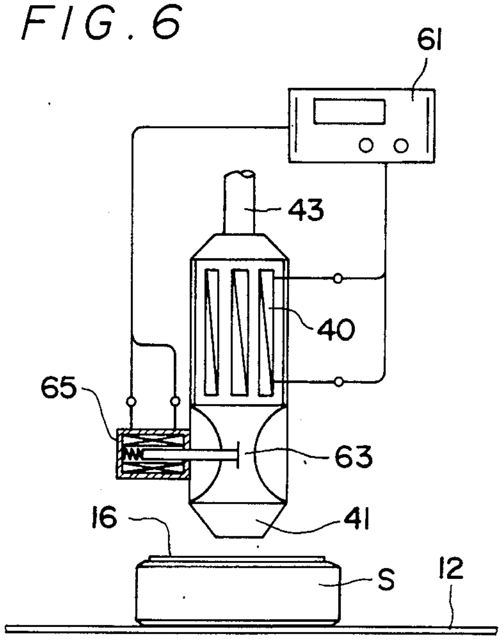
FIG. 5 is a schematic side view showing essential parts of the coating layer hardening device in an enlarged scale.

As shown in FIG. 4, the coating layer hardening device 3 includes along the conveyor 12 a normal temperature air outlet 18 from a blower 38, a far infrared ray ceramic heater 9, a normal temperature air outlet 42 from a blower 39, and three cool air outlets 41 from temperature controllers 40. The quantity of air emitted from the air outlet 42 and the cool air outlets 41 is controlled by regulating valves 63 as shown in FIG. 5. Each regulating valve 63 is driven by an electromagnetic actuator 65 to adjust a discharge orifice of a cool air outlet 41. The stroke of the electromagnetic actuator 65 is controlled by a control device 61.

Connected to the temperature controllers 40 by a duct 43 is a heat exchanger 44. Air pulled by a blower 45 from an air intake 46 is cooled by the heat exchanger 44 and fed to the duct 43. Cooling air in the heat exchanger 44 is a coolant which is compressed by a compressor 48 and fed to a condenser 47, where the coolant is cooled and liquified and circulated to an evaporator 50 via an expansion valve 49.

Figure 6:
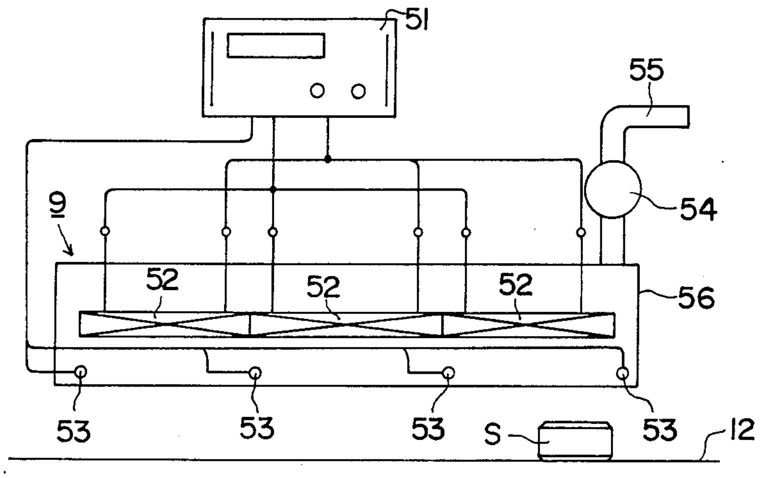
FIG. 6 is an enlarged view of a heating section shown in FIG. 1.
Figure 7:
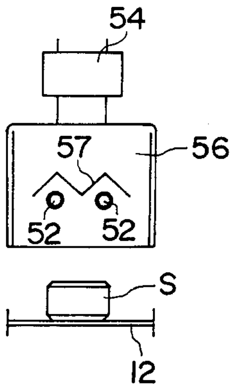
FIG. 7 is a schematic front view of the heating section.

Actually, the heater 9 has three far infrared ray ceramic heaters 52 disposed interiorly of a hood 56, as shown in FIGS. 6 and 7. These ceramic heaters 52 are controlled by a control device 51 in accordance with signals of respective temperature sensors 53. Vaporized gases generated by drying of the soap S are discharged through a valve air discharging device 54 disposed in a duct 55. The soap S is heated directly by the ceramic heaters 52 or by the far infrared radiation which is reflected by a reflector 57 to thereby harden the coating layer 16.

Figure 8:
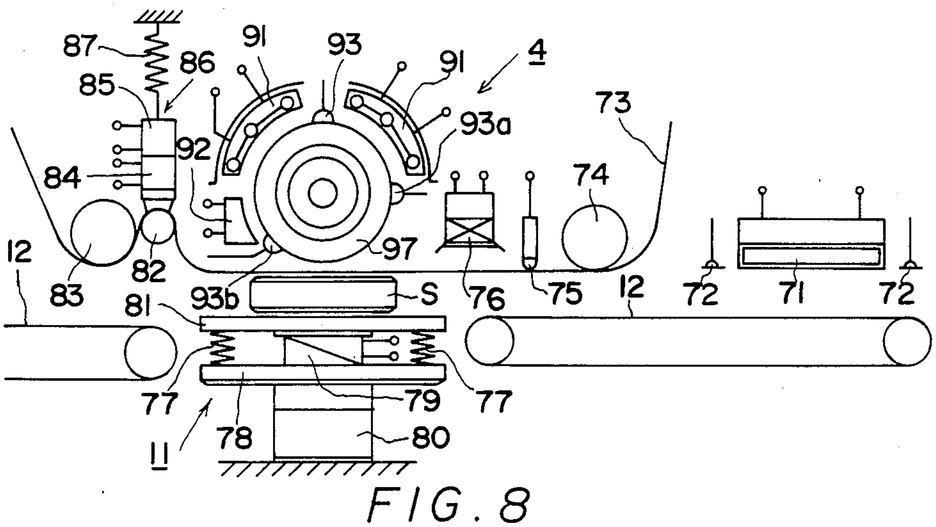
FIG. 8 is a schematic side view of a heat transfer machine shown in FIG. 1.

As shown in FIG. 8, the heat transfer machine 4 includes a pressing base 11 and a heated roller 97 disposed on opposite side of the conveyor 12. Further, a transfer film 73 is stretched along the conveyor 12 and between the base 11 and the roller 97 by a plurality of rollers 74, 82 and 83. The left end of the transfer film 73 is wound intermittently by a winder (not shown). Supporting the tension roller 82 is a vibrator 86, which is in turn supported on a frame (not shown) of the device through a spring 87. A sensor 75 is mounted adjacent to the transfer film 73 and detects the boundary lines 17 shown in FIG. 2. In response to the sensor 75, the feed of the transfer film 73 is stopped at predetermined positions. The vibrator 86 comprises a magnetic actuator 85 which adjusts the tension exerted by the tension roller 82 on the transfer film 73. A resultant fine vibration is imparted to the transfer film 73 by means of an AC vibrating coil 84.

Figure 9:
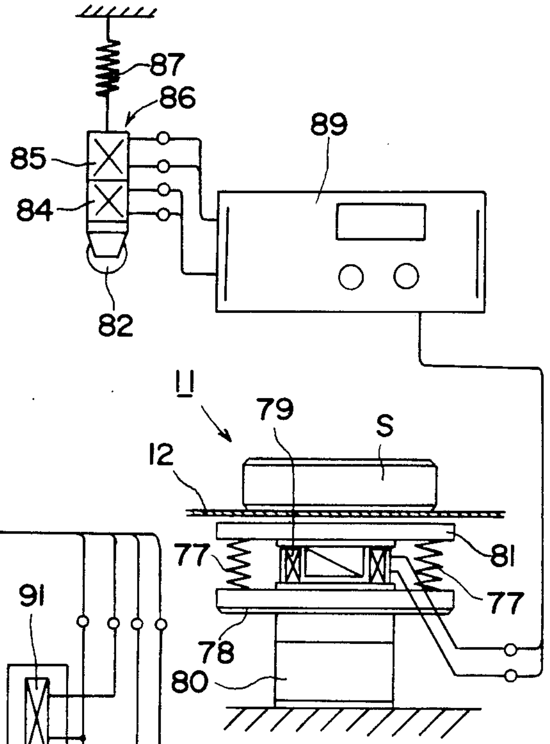
FIG. 9 is a schematic side view showing essential parts of the heat transfer machine.

In the pressing base 11, a primary base 81 is supported by springs 77 on an intermediate base 78. Supporting the base 78 is an elevating transfer device 80 such as a fluid pressure actuator that produces relative movement between the base 81 and the roller 97. Additional relative movement of the support base 81 is produced by an electromagnetic vibrator 79 that cyclically varies the pressure applied between the base 81 and the roller 79. The amplitudes of the pressure fluctuating vibrator 79 and the aforementioned vibrator 86 are controlled to approximately 0.3 mm by means of a control device 89 as shown in FIG. 9.

As also shown in FIG. 8, far infrared ray ceramic heaters 91 apply heat to a first surface portion of the roller 97 located opposite to the base 81. Detecting the temperature of the roller 97 are three temperature sensors 93, 93*a* and 93*b* disposed in close proximity thereto. The sensors 93, 93*a* and 93*b* control an output of an auxiliary heater 92 which is disposed to apply heat to a second surface portion of the roller 97 located between the primary heaters 91 and the soap exit end of the base 81. Positioned adjacent to the roller 97 and opposite to the base 81 is the sensor 93. The sensor 93*a* is located to detect the temperature of a third surface portion of the roller 97 disposed between the first surface portion heated by the heaters 91 and the soap entrance end of the base 81 and the sensor 93*b* is positioned to detect the temperature of a fourth surface portion of the roller 97 located between the second surface portion heated by the auxiliary heater 92 and the soap exit end of the base 81. A preheater 71 is disposed upstream of the conveyor 12 to preheat the soap S fed towards the heat transfer machine 4. The heat output of the preheater 71 is controlled in accordance with the signal of temperature sensors 72.

Figure 10:
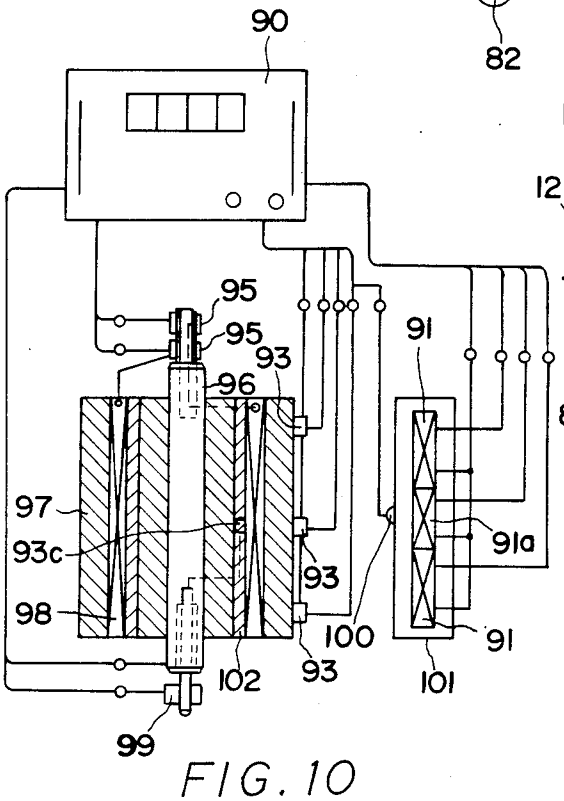
FIG. 10 is a schematic plan sectional view of a heating roller shown in FIG. 8.

As shown in FIG. 10, the heated roller 97 comprises a spindle 96 on which a soft roller such as rubber is mounted. Imbedded in the roller 97 are a far infrared ray ceramics heater 98 and a reflector 102 provided with an internal temperature sensor 93*c*. A signal from the sensor 93*c* is fed to a control device 90 via slip rings 95 and 99 to control the electric current applied to the ceramic heater 98 and the primary heater 91 so as to obtain a predetermined surface temperature for the heated roller 97. The primary ceramic heater 91 is divided into three portions, i.e. a portion adjacent to the center of the heating roller 97 and straddling portions adjacent to opposite ends thereof.

Figure 11:
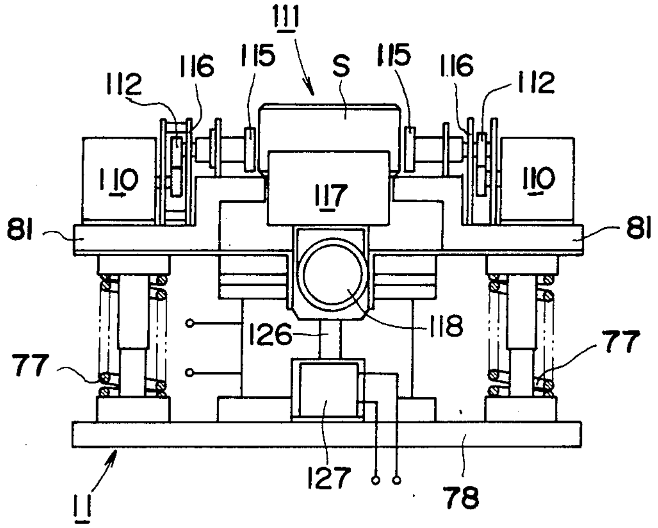
FIG. 11 is a schematic front view showing a locating device for the receiving article.
Figure 12:
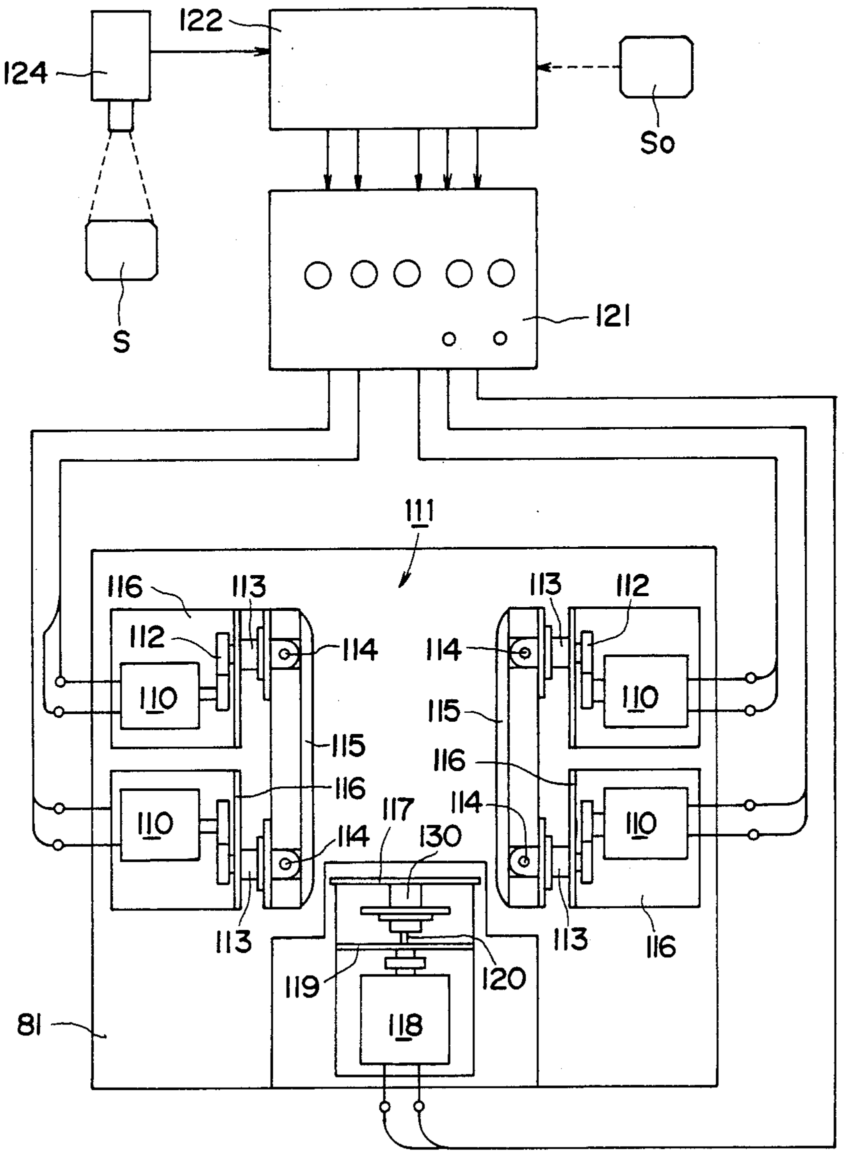
FIG. 12 is a schematic plan view of the locating device shown in FIG. 11.

As shown in FIGS. 11 and 12, the support base 81 is provided with a locating device 111 to stop the soap S at a predetermined position associated with the heating roller 97. More particularly, a vertically retractable stop plate 117 for stopping the soap S at the exit end of the base 81 is supported on a bracket 119. The stop plate 117 is movable in a direction transverse to the feeding direction of the conveyor 12. An electric motor 118 is supported on the bracket 119, and a threaded shaft 120 coupled to the main shaft of the motor is threadedly fitted into a nut 130 secured to the stop plate 117. Position adjustment of the stop plate 117 is produced by normal and reverse rotation of the servo-electric motor 118. The stop plate 117 and servo-electric motor 118 are projected upwardly or retracted downwardly from the surface of the support base 81 by an elevating device 127, such as a fluid pressure actuator or an electromagnetic actuator, with the aid of stanchions 26.

Additionally provided are a pair of left and right guide plates 115 for adjusting the lateral position of the soap S. The plates 115 are supported for movement laterally with respect to the support base 81. More particularly, a pair of front and rear nuts 113 are connected to the guide plates 115 by means of pins 114, and threaded shafts threadedly fitted into the nuts 113 are rotated in normal and reverse directions by servo-electric motors 110 through reduction gear mechanisms 112. While the servo-electric motors 118 and 110 can be adjusted with manual dials 121, they are automatically adjusted by a pattern comparator 122. The pattern comparator 122 stores a reference pattern set in connection with the image on the transfer film 73 and the soap S, and receives from the position detector 5 shown in FIG. 1, a pattern including the soap S and an image transferred thereonto. The detected pattern and the reference pattern are compared by the pattern comparator 122, and the servo-electric motors 118 and 110 are driven in accordance with a deviation in position therebetween.

OPERATION

In the coating device 2, moisture adhered to the surface of the soap S is removed by the water absorbing roller 30. Next, the surface of the soap is dried by applying heated compressed air and the primary coating agent is sprayed thereon and thereafter dried by heated air. The second and third coating agents are sprayed in the same manner to form an adhesive layer 16 having a predetermined thickness. Bubbles of a solvent resulting from the coating operation are removed by applying heated air.

In the case of soap S, the coating agent forms a coated film which is not dissolved or removed by water and in which a transferred image remains permanently, the coating being formed of a thermoplastic synthetic resin such as acrylic which reacts with far infrared radiation to be dried and hardened in a short period of time. The coating layer 16 is heated and hardened by the heater 9 composed of far infrared ray ceramic heaters in the hardening device 3. When the coating agent comprises an acrylic material, the wave length of the far infrared radiation is suitably between 50 and 100 um. The far infrared radiation has properties which are different in absorptivity according to material being irradiated and heats only the surface thereof.

Because of the irradiation provided by the ceramic heater, the solvent becomes vaporized and the coating layer 16 is gradually hardened to form a coated film. The required irradiation time is extremely short, and should the irradiation take place for a longer period of time, the the soap S itself can become softened and possibly deformed during the image transfer. Therefore, the coating layer is cooled by the cooler 10 first to a normal temperature (20° to 25° C.), then to approx. 10° C. in a first cooling which uses cool air from the cool air outlet 41, then to approx. 4° C. in a second cooling, and finally to approx. 0° C. in a third cooling.

Next, the soap S is fed to the heat transfer machine 4, and the coating layer 16 is heated by the preheating ceramic heater 71 to reduce a heat load on the heated roller 97. Since the ceramic heater heats only the surface of the soap S, namely, the coating layer 16 for a short period of time, softening of the soap S is prevented. When positioned under the transfer film 73 in which an image is pre-positioned by the sensor 75, the soap S impinges upon the stop plate 17 shown in FIG. 11 and is stopped. The previously lowered base 78 then is raised by the elevating device 80 to press the soap S and the transfer film 73 between the heated roller 97 and the base 81. Accordingly, the image on the transfer film 73 heated by the preheater 76 is pressed against the coating layer 16 of the soap S and transferred thereto by the heat of the heated roller 97. At this time, the stop plate 117 has been moved down by the elevating device 118 and the soap S is fed leftward (FIG. 8) as the heated roller 97 rotates. When the next boundary line 17 is detected by the sensor 75, feed of the transfer film 73 again is stopped, at which time, the soap S is delivered leftward onto the support base 81 by the conveyor 12.

During the period of image transfer, the support base 81 is vibrated vertically at low amplitude by the electromagnetic vibrator 79 to prevent fusion between the transfer film 73 and the coating layer 16. At the same time, the tension roller 82 is vibrated by the vibrator 86 and the transfer film 73 is peeled from the soap S as soon as the former is disengaged from the heated roller 97. The temperature of a portion of the heated roller 97 in contact with the soap S through the transfer film 73 is lowered during the image transfer. However, that portion is heated by the auxiliary heater 92 as soon as it is disengaged from the soap S and restored to a desired surface temperature by the time it again comes into contact with a new bar of soap S. The heat output of the auxiliary heater 92 is precisely controlled so as to compensate for a loss of heat transmitted from the surface of the heated roller 97 to the soap S, and therefore, the distribution of the roller's surface temperature is kept uniform. More specifically, the roller surface temperature prior to image transfer is detected by the temperature sensor **93*a* and the temperature after transfer is detected by the temperature sensor 93*b*. These detected signals are compared in the temperature control device 90, and the heating temperature of the auxiliary heater 92** is controlled in accordance with the signal obtained by the temperature control device to thereby replenish the heat carried away during the image transfer processing.

The electromagnetic actuator 85 adjusts the average tension on the transfer film 73, and the vibrating coil 84 of the vibrator 86 varies the tension on the transfer film 73 within a predetermined range. The temperature of the heat transfer roller 97 is set in the range of from 150° to 250° C. A suitable vibration rate for the vibrator 86 is between 30 to 200 Hz. Also, a soft material such as a thin urethane rubber is interposed between the lower surface of the support base 81 and the electromagnetic vibrator 79.

As described above, since the support base 81 supporting the soap S is vibrated by the vibrator 79, the pressure applied between the transfer film 73 and the soap S by the heated roller 97 fluctuates. Therefore, during the image transfer and while the soap is moving forwardly, the coating 16 and the image 15 are repeatedly subjected to cooling and heating. At the same time, the transfer film 73 having passed through the heated roller 97 is rapidly peeled from the surface of the soap S by the vibration produced by the vibrator 86. Therefore, only the desired image remains on the surface of the soap S and the transfer film 73 is smoothly peeled therefrom.

Accordingly, compared with conventional equipment in which a heated roller is merely pressed against the surface of the soap S, the present system transfers an image more evenly and more smoothly removes the transfer film 73 from the surface of the soap S. Thereby, it is possible to prevent an occurrence of unacceptable articles produced when the transfer film 73 becomes fused to the surface of the soap S and the coating layer 16 is removed together with the transfer film 73. In addition, even if the heat transfer rate is increased, it is possible to perform the transfer of a uniform image without unevenness and well-finished products can be efficiently produced automatically without the attention of an operator.

Obviously, many modifications and variations of the present invention are possible in light of the above teachings. It is to be understood, therefore, that the invention can be practiced otherwise than as specifically described.

What is claimed:

1. Apparatus for transferring an image to an article and comprising:

a base for supporting an article;

article conveyor means for sequentially moving articles onto and off of said base in a given direction between an entrance end of said base and an exit end thereof;

a roller disposed adjacent to said base;

image conveyor means for sequentially moving transferrable images into a position between said base and said roller;

transfer means for producing relative movement between said base and said roller such that an image and an article are pressed together therebetween;

a primary heater means spaced from said roller for transferring heat to a first surface portion of said roller located opposite to said base;

an auxiliary heater spaced from said roller for transferring heat to a second surface portion of said roller, said second surface portion located between said first surface portion and said exit end of said base;

a first temperature sensor for sensing the temperature of a third surface portion of said roller located between said first surface portion and said entrance end of said base;

a second temperature sensor for sensing the temperature of a fourth surface portion of said roller located between said second surface portion and said exit end of said base; and control means for controlling said auxiliary heater in response to a difference in temperature sensed by said first and second temperature sensors.

2. An apparatus according to claim 1 wherein said image conveyor means comprises a belt conveyor for moving said transferrable images and including belt vibration means for producing vibration of said belt conveyor in a direction of separation of said roller and said base.

3. An apparatus according to claim 2 including pressure fluctuation means for cyclically varying the pressure applied between said base and said roller by said transfer means.

* * * * *